(12) United States Patent
Honda et al.

(10) Patent No.: US 8,936,674 B2
(45) Date of Patent: Jan. 20, 2015

(54) CONDUCTIVE SILICA SOL COMPOSITION, AND MOLDED ARTICLE PRODUCED USING THE SAME

(75) Inventors: Tsunetoshi Honda, Akita (JP); Tsutomu Atsuki, Chiba (JP); Natsumi Sakuraba, Odate (JP)

(73) Assignees: Mitsubishi Materials Corporation, Tokyo (JP); Mitsubishi Materials Electronic Chemicals Co., Ltd., Akita-Shi (JP)

( * ) Notice: Subject to any disclaimer, the term of this patent is extended or adjusted under 35 U.S.C. 154(b) by 887 days.

(21) Appl. No.: 12/998,490

(22) PCT Filed: Nov. 13, 2009

(86) PCT No.: PCT/JP2009/006092
§ 371 (c)(1),
(2), (4) Date: Apr. 27, 2011

(87) PCT Pub. No.: WO2010/055678
PCT Pub. Date: May 20, 2010

(65) Prior Publication Data
US 2011/0210295 A1    Sep. 1, 2011

(30) Foreign Application Priority Data

Nov. 14, 2008  (JP) ................................. 2008-292530

(51) Int. Cl.
| | | |
|---|---|---|
| *C09D 183/06* | (2006.01) | |
| *C09K 3/16* | (2006.01) | |
| *C09D 1/00* | (2006.01) | |
| *C09D 5/18* | (2006.01) | |
| *C09D 5/24* | (2006.01) | |
| *C09D 7/12* | (2006.01) | |
| *C23C 18/12* | (2006.01) | |
| *C08K 3/22* | (2006.01) | |

(52) U.S. Cl.
CPC ... *C09K 3/16* (2013.01); *C09D 1/00* (2013.01); *C09D 5/18* (2013.01); *C09D 5/24* (2013.01); *C09D 7/1216* (2013.01); *C23C 18/1212* (2013.01); *C23C 18/122* (2013.01); *C23C 18/1245* (2013.01); *C23C 18/1254* (2013.01); *C08K 3/22* (2013.01); *C09K 2208/30* (2013.01)
USPC ............... 106/287.16; 106/38.2; 106/287.32; 252/519.4; 428/447

(58) Field of Classification Search
CPC ...... C09D 183/04; C09D 183/06; C09D 5/00; C09D 183/02

USPC .................. 427/161, 164, 299; 428/429, 447; 106/287.11, 287.14, 38.2, 287.16, 106/287.32; 252/519.4
See application file for complete search history.

(56) References Cited

U.S. PATENT DOCUMENTS

| | | | |
|---|---|---|---|
| 5,873,931 | A | 2/1999 | Scholz et al. |
| 6,358,601 | B1 | 3/2002 | Bilkadi |
| 2008/0014450 | A1 | 1/2008 | Yoshikawa et al. |

FOREIGN PATENT DOCUMENTS

| | | |
|---|---|---|
| CN | 1284976 A | 2/2001 |
| CN | 1427873 A | 7/2003 |
| CN | 1550495 A | 12/2004 |
| CN | 1834171 A | 9/2006 |
| JP | 06-299090 A | 10/1994 |
| JP | 07-034007 A | 2/1995 |
| JP | 07-157693 A | 6/1995 |
| JP | 07-233268 A | 9/1995 |
| JP | 07-305000 A | 11/1995 |
| JP | 09-024335 A | 1/1997 |
| JP | 2001-509532 A | 7/2001 |
| JP | 2005-146110 A | 6/2005 |
| JP | 2006-028469 A | 2/2006 |
| JP | 2006-137790 A | 6/2006 |
| JP | 2008-019342 A | 1/2008 |
| JP | 2008-163271 A | 7/2008 |
| JP | 2008-163272 A | 7/2008 |
| JP | 2008-163273 A | 7/2008 |
| JP | 2009-091390 A | 4/2009 |

OTHER PUBLICATIONS

Office Action mailed Apr. 16, 2013, issued for the Japanese patent application No. 2010-537709 and English translation thereof.
Supplementary European Search Report dated Apr. 26, 2013, issued for the European patent application No. 09825931.0.
Office Action mailed Feb. 5, 2013, issued for the Chinese Patent Application No. 200980144155.X and English translation thereof.
International Search Report mailed Jan. 19, 2010, issued on the related PCT (PCT/JP2009/006092) with English translation thereof.
Notice of Allowance dated Oct. 8, 2013, issued for the Chinese patent application No. 200980144155.X.

*Primary Examiner* — Mark Kopec
*Assistant Examiner* — Haidung Nguyen
(74) *Attorney, Agent, or Firm* — Edwards Wildman Palmer LLP; James E. Armstrong, IV; Nicholas J. DiCeglie, Jr.

(57) ABSTRACT

The present invention provides a conductive silica sol composition containing at least a silica sol composition, and at least one selected from perfluoroalkyl sulfonates perfluoroalkyl sulfone imide salts, and bis(fluorosulfonyl) imide salts.

16 Claims, No Drawings

CONDUCTIVE SILICA SOL COMPOSITION, AND MOLDED ARTICLE PRODUCED USING THE SAME

TECHNICAL FIELD

The present invention relates to a silica sol compound and a molded product using the same.

Priority is claimed on Japanese Patent Application, No. 2008-292530, filed on Nov. 14, 2008, the contents of which are incorporated herein by reference.

BACKGROUND ART

A silica-based coating film has superior heat resistance, abrasion resistance, and corrosion resistance. Therefore, such a silica-based coating film has been widely used as a film for protecting the surface of molded products made of various synthesized resins, or glass.

As a method for forming the silica-based coating film, various methods are known. However, in general, a sol-gel method has been widely used. The sol-gel method is a method in which alkoxysilane is dissolved in an organic solvent containing mainly alcohol, and the alkoxysilane is hydrolyzed and condensed to prepare a coating solution containing a silica sol composition, then the obtained coating solution is coated on the surface of the molded product, and subjected to a heat treatment to form a silica-based coating film.

On the other hand, it is required to provide functions in accordance with the intended use of the coating film on the surface of molded products made of various synthesized resins, or glass. Therefore, various silica-based coating films having various functions have been developed. For example, in order to provide an antibacterial inorganic coating film having antibacterial activity for a long period of time, a silica-based coating film is suggested in which an antibacterial agent, such as silver, copper, and titanium oxide, is added to an inorganic coating solution containing a silica dispersion oligomer solution (Patent Document No. 1).

In addition, a silica-based coating film, which can prevent the surface of the molded product from being charged, is desired, and the development of a silica sol composition having conductivity is desired.

PRIOR ART DOCUMENT

Patent Document

[Patent Document No. 1] Japanese Unexamined Patent Application, First Publication No. H9-24335

DISCLOSURE OF THE INVENTION

Problems to be Solved by the Invention

The object of the present invention is to provide a conductive silica sol composition having excellent conductivity, and a molded product produced using the conductive silica sol composition.

Means for Solving the Problem

In order to achieve the object, the present invention provides the following conductive silica sol composition, and the molded product.

[1] A conductive silica sol composition containing:
a silica sol composition containing a silica film-forming component; and
at least one compound selected from the group consisting of the compounds represented by the following formulae (1) and (2)

$$Rf^1SO_3.X \qquad (1)$$

$$(Rf^2SO_2)(Rf^3SO_2)N.X \qquad (2)$$

in the formulae (1) and (2),
$Rf^1$, $Rf^2$, and $Rf^3$ represent fluorine or a perfluoroalkyl group having 1 to 4 carbon atoms, and $Rf^2$ and $Rf^3$ may be the same or different from each other, and
X represents a cation selected from the group consisting of an alkali metal, alkali earth metal, ammonium, phosphonium, alkyl ammonium, and alkyl phosphonium.

[2] A conductive silica sol composition according to [1], wherein X in the formulae (1) and (2) represents a cation selected from the group consisting of $Li^+$, $Na^+$, and $K^+$.

[3] A conductive silica sol composition according to [1] or [2], wherein the silica film-forming component contains silica sol which is obtained by hydrolysis of tetraalkoxysilane.

[4] A conductive silica sol composition according to any one of [1] to [3], wherein the conductive silica sol composition contains 0.01 to 50.0 parts by mass of the compound represented by the formula (1) or (2), relative to 100 parts by mass of the silica film-forming component.

[5] A molded product containing a coating film obtained by using the conductive silica sol composition according to any one of [1] to [4].

Effects of the Present Invention

According to the conductive silica sol composition of the present invention, at least one compound selected from the group consisting of the compounds represented by the following formulae (1) and (2) has excellent solubility in the silica sol composition having a siloxane structure. Therefore, it is possible to produce a conductive silica sol composition having excellent conductivity, in which cations are dispersed uniformly.

According to the molded product which is produced by using the conductive silica sol composition of the present invention, it is possible to provide a molded product containing a silica-based coating film having excellent conductivity.

BEST MODE FOR CARRYING OUT THE INVENTION

The conductive silica sol composition according to the present invention will be explained in detail below.

The conductive silica sol composition according to the present invention contains at least a conductive agent, and a silica sol composition.

Moreover, the conductive silica sol composition according to the present invention may contain other components, such as water, organic solvents, polymerizable monomers, prepolymers, oligomers, and polymers.

The components contained in the conductive silica sol composition according to the present invention will be explained.

First, the conductive agent is explained.

The conductive agent is at least one compound selected from the group consisting of the compounds represented by the formulae (1) and (2).

$$Rf^1SO_3.X \quad (1)$$

$$(Rf^2SO_2)(Rf^3SO_2)N.X \quad (2)$$

in the formulae (1) and (2), $Rf^1$, $Rf^2$, and $R^3$ represent fluorine or a perfluoroalkyl group having 1 to 4 carbon atoms, and $R^2$ and $Rf^3$ may be the same or different from each other, and X represents a cation selected from the group consisting of an alkali metal, alkali earth metal, ammonium, phosphonium, alkyl ammonium, and alkyl phosphonium.

Examples of the compound represented by the formula (1) include perfluoroalkyl sulfonates, such as fluorosulfonates ($FSO_3.X$), trifluoromethane sulfonates ($CF_3SO_3.X$), pentafluoroethane sulfonates ($C_2F_5SO_3.X$), pentafluoropropane sulfonates ($C_3F_7SO_3.X$), and nonafluorobutane sulfonates ($C_4F_9FSO_3.X$).

Examples of the compound represented by the formula (2) when Re and Re are the same (that is, the compound which is represented by formula (2) and has a symmetrical structure) include perfluoroalkyl sulfone imide salts, such as bis(fluorosulfonyl) imide salt [$(FSO_2)_2N.X$], bis(trifluoromethane sulfonyl)imide salt [$(CF_3SO_2)_2N.X$], bis(pentafluoroethane sulfonyl) imide salt [$(C2F_5SO_2)_2N.X$], bis(heptafloropropane sulfonyl) imide salt [$(C3F_7SO_2)_2N.X$], and bis(nonafluorobutane sulfonyl) imide salt [$(C4F_9SO_2)_2N.X$].

Examples of the compound represented by the formula (2) when $Rf^2$ and $Rf^3$ are different from each other (that is, the compound which is represented by formula (2) and has a asymmetrical structure) include trifluoro-N-(fluorosulfonyl) methane sulfonyl amide salt [$(FSO_2)(CF_3SO_2)_2N.X$], pentafluoro-N-(fluorosulfonyl)ethane sulfonyl amide salt [$(FSO_2)(C_2F_5SO_2)_2N.X$], heptafluoro-N-(fluorosulfonyl) propane sulfonyl amide salt [$(FSO_2)(C_3F_7SO_2)_2N.X$], nonafluoro-N-(fluorosulfonyl) butane sulfonyl amide salt [$(FSO_2)(C_4F_9SO_2)_2N.X$], pentafluoro-N-[(trifluoromethyl) sulfonyl] ethane sulfonylamide salt [$(CF_3SO_2)(C_2F_5SO_2)_2N.X$], pentafluoro-N-[(trifluoromethyl) sulfonyl] propane sulfonylamide salt [$(CF_3SO_2)(C_3F_7SO_2)_2N.X$], nonafluoro-N-[(trifluoromethyl) sulfonyl] buthane sulfonylamide salt [$(CF_3SO_2)(C_4F_9SO_2)_2N.X$], heptafluoro-N-[(pentafluoroethyl) sulfonyl] propane sulfonylamide salt [$(C_2F_5SO_2)(C_3F_7SO_2)_2N.X$], nonafluoro-N-[(pentafluoroethyl) sulfonyl] buthane sulfonylamide salt [$(C2F_5SO_2)(C_4F_9SO_2)_2N.X$], and nonafluoro-N-[(heptafluoropropane) sulfonyl] buthane sulfonylamide salt [$(C_3F_7SO_2)(C_4F_9SO_2)_2N.X$].

Among these, lithium salts, sodium salts, or potassium salts are preferable. In other words, the compounds represented by the formula (1) or (2), wherein X is a lithium ion ($Li^+$), a sodium ion ($Na^+$) or a potassium ion ($K^+$) are preferable.

Specifically, it is preferable that the compound represented by the formula (1) be lithium fluorosulfonate, sodium fluorosulfonate, potassium fluorosulfonate, lithium trifluoromethane sulfonate, sodium trifluoromethane sulfonate, potassium trifluoromethane sulfonate, lithium pentafluoroethane sulfonate, sodium pentafluoroethane sulfonate, potassium pentafluoroethane sulfonate, lithium heptafluoropropane sulfonate, sodium heptafluoropropane sulfonate, potassium heptafluoropropane sulfonate, lithium nonafluorobutane sulfonate, sodium nonafluorobutane sulfonate, or potassium nonafluorobutane sulfonate.

It is preferable that the compound represented by the formula (2) be lithium bis(fluorosulfonyl)imide, sodium bis (fluorosulfonyl)imide, potassium bis(fluorosulfonyl)imide, lithium bis(trifluoromethane sulfonyl)imide, sodium bis(trifluoromethane sulfonyl)imide, potassium bis(trifluoromethane sulfonyl)imide, lithium bis(pentafluoroethane sulfonyl)imide, sodium bis(pentafluoroethane sulfonyl)imide, potassium bis(pentafluoroethane sulfonyl)imide, lithium bis (heptafluoropropane sulfonyl)imide, sodium bis(heptafluoropropane sulfonyl)imide, potassium bis(heptafluoropropane sulfonyl)imide, lithium bis(nonafluorobuthane sulfonyl)imide, sodium bis(nonafluorobuthane sulfonyl)imide, potassium bis(nonafluorobuthane sulfonyl)imide, lithium trifluoro-N-(fluorosulfonyl)methane sulfonyl amide, sodium trifluoro-N-(fluorosulfonyl)methane sulfonyl amide, potassium trifluoro-N-(fluorosulfonyl)methane sulfonyl amide, lithium pentafluoro-N-(fluorosulfonyl)ethane sulfonyl amide, sodium pentafluoro-N-(fluorosulfonyl)ethane sulfonyl amide, potassium pentafluoro-N-(fluorosulfonyl)ethane sulfonyl amide, lithium pentafluoro-N-(fluorosulfonyl)propane sulfonyl amide, sodium pentafluoro-N-(fluorosulfonyl) propane sulfonyl amide, potassium pentafluoro-N-(fluorosulfonyl)propane sulfonyl amide, lithium nonafluoro-N-(fluorosulfonyl)buthane sulfonyl amide, sodium nonafluoro-N-(fluorosulfonyl)buthane sulfonyl amide, potassium nonafluoro-N-(fluorosulfonyl)buthane sulfonyl amide, lithium pentafluoro-N-[(trifluoromethyl) sulfonyl]ethane sulfonyl amide, sodium pentafluoro-N-[(trifluoromethyl) sulfonyl]ethane sulfonyl amide, potassium pentafluoro-N-[(trifluoromethyl) sulfonyl]ethane sulfonyl amide, lithium heptafluoro-N-[(trifluoromethyl) sulfonyl]propane sulfonyl amide, sodium heptafluoro-N-[(trifluoromethyl) sulfonyl] propane sulfonyl amide, potassium heptafluoro-N-[(trifluoromethyl) sulfonyl]propane sulfonyl amide, lithium nonafluoro-N-[(trifluoromethyl) sulfonyl]butane sulfonyl amide, sodium nonafluoro-N-[(trifluoromethyl) sulfonyl]butane sulfonyl amide, potassium nonafluoro-N-[(trifluoromethyl) sulfonyl]butane sulfonyl amide, lithium heptafluoro-N-[(pentafluoroethyl) sulfonyl]propane sulfonyl amide, sodium heptafluoro-N-[(pentafluoroethyl) sulfonyl]propane sulfonyl amide, potassium heptafluoro-N-[(pentafluoroethyl) sulfonyl]propane sulfonyl amide, lithium nonafluoro-N-[(pentafluoroethyl) sulfonyl]buthane sulfonyl amide, sodium nonafluoro-N-[(pentafluoroethyl) sulfonyl]buthane sulfonyl amide, potassium nonafluoro-N-[(pentafluoroethyl) sulfonyl]buthane sulfonyl amide, lithium nonafluoro-N-[(heptafluoropropane) sulfonyl]buthane sulfonyl amide, sodium nonafluoro-N-[(heptafluoropropane) sulfonyl]buthane sulfonyl amide, potassium nonafluoro-N-[(heptafluoropropane) sulfonyl]buthane sulfonyl amide, or lithium nonafluoro-N-[(heptafluoropropane) sulfonyl]buthane sulfonyl amide.

These compounds have a high melting point. Therefore, when the conductive silica sol containing the compound is made into a coating film, the compound does not bleed from the coating film under high temperatures. Due to this, it is possible to provide a conductive silica sol composition having excellent bleed resistance. Therefore, these compound are preferable.

Moreover, "excellent bleed resistance" in the present invention means that when the coating film is heated at 100° C. for 10 minutes, and the surface of the coating film is rubbed 20 times using a cotton cloth with a load of 3 kg or more, the conditions of the coating film do not change between before and after rubbing.

Next, the silica sol composition is explained.

The silica sol composition contains at least the silica film-forming component, and a solvent. A catalyst and the like can be added to the composition.

The silica film-forming component is not particularly limited, and this means a component containing a compound which provides silica sol by hydrolysis can be used.

Examples of the compound which provides silica sol by hydrolysis include alkoxysilane compounds. The alkoxysilane compound becomes a polymer having a siloxane bond represented by —Si—O—, via hydrolysis and polymerization condensation, and finally provides a silica-based coating film.

It is preferable that the alkoxysilane compound be tetraalkoxysilane represented by the formula (3) shown below.

$$Si(OR^1)_4 \quad (3)$$

In the formula (3), le represents an alkyl group having 1 to 10 carbon atoms, and preferably an alkyl group having 1 to 6 carbon atoms. Specifically, a methyl group, ethyl group, n-propyl group, isopropyl group, butyl groups, pentyl groups, or hexyl groups are preferable. Four $OR^1$ may be the same or different from each other.

Moreover, when $R^1$ has 11 or more carbon atoms, it is not readily hydrolyzed. Due to this, it is difficult to produce a silica sol having a target high molecular weight.

Examples of the tetraalkoxysilane denoted by the formula (3) include tetramethoxysilane, tetraethoxysilane, tetrapropoxysilane, tetraisopropoxysilane, ethoxytrimethoxysilane, propoxytrimethoxysilane, isopropoxytrimethoxysilane, methoxytriethoxysilane, propoxytriethoxysilane, isopropoxytriethoxysilane, methoxytripropoxyysilane, ethoxytripropoxysilane, diethoxydimethoxysilane, and dimethoxydipropoxysilane. Among these tetraalkoxysilanes, tetramethoxysilane and tetraethoxysilane are preferable, because of their excellent hydrolyzability and ease of availability.

The alkoxysilane may be used alone or in combination of two or more. In addition, a partial hydrolysate of the alkoxysilane may also be used. Furthermore, alkoxysilane oligomers (low polymers), which are condensates of the hydrolysate, may also be used. These compounds may be used in combinations.

Furthermore, it is also possible to use copolymers of the alkoxysilane and olganoalkoxysilane, such as methyl trimethoxysilane, methyl triethoxysilane, and phenyl trimethoxysilane. Polymers having a reactive group, such as a silane-coupling group, at the end of the molecular may also be used.

It is preferable that the silica sol composition contain a catalyst, etc. in addition to the silica film forming component and the solvent. When the silica sol composition contains the solvent and the catalyst, hydrolysis of the alkoxysilane compound is promoted in the silica sol composition. Due to this, silica sol is easily obtained.

In other words, the silica film forming component is a silica sol composition which is obtained by hydrolysis of the alkoxysilane in the organic solvent containing water, and preferably further in the presence of the catalyst.

Examples of the organic solvent contained in the silica film forming component include alcohols such as methanol, ethanol, isopropanol, and butanol; ketones such as acetone, methyl ethyl ketone, and methyl isobutyl ketone; and hydrocarbons such as toluene, xylene, hexane, and cyclohexane. These organic solvents can be used alone or in combination of two or more.

Among these organic solvents, alcohols are preferably used. Alcohol solvents include ether group-containing alcohols such as methoxyethanol, and methoxypropanol. The ether group-containing alcohol may be used together with normal alcohol.

Examples of the catalyst for hydrolysis, which can be used in the silica film forming component, include inorganic acids such as lithium hydroxide, sodium hydroxide, potassium hydroxide, potassium carbonate, sodium hydrogen carbonate, sulfuric acid, nitric acid, and hydrochloric acid. In addition, organic strong acids, such as para-toluene sulfonate can also be used.

The silica sol composition can be obtained as a solution (reaction solution) containing alcohol produced by the hydrolysis and remaining water which is not reacted, as a solvent. The reaction solution itself can be used as the silica sol composition. In addition, a solvent can be further added to the reaction solution. Furthermore, it is possible to remove the solvent from the reaction solution. Furthermore, it is also possible to dissolve the silica sol composition, which is obtained by removing the solvent, in the solvent.

In the present invention, the content of the conductive agent in 100 parts by mass of the silica film forming component in the conductive silica sol composition is preferably in a range from 0.01 to 50.0 parts by mass, and more preferably in a range from 0.1 to 20 parts by mass. When the content of the conductive agent relative to the silica film forming composition is 0.01 parts by mass or more, sufficient conductive effects can be obtained. In contrast, when it is 50.0 parts by mass or less, a film which is made by coating the conductive silica sol composition, and the obtained film is used under high temperatures, bleeding from the film obtained is not readily caused. The possibility of phase separation occurring is extremely low. In other words, when the conductive agent is contained in the conductive silica sol composition so as to satisfy the range, bleeding from the film is hardly caused even under high temperature-usage conditions. A conductive silica sol composition having high bleed resistance and excellent conductivity can be obtained.

As explained above, the conductive silica sol composition according to the present invention can contain other components such as water, organic solvents, polymerizable monomers, prepolymers, oligomers, and polymers.

Examples of the organic solvent, other than the organic solvents contained in the silica sol composition, include chlorine-based solvents such as chloroform, and methylene chloride; ester-based solvents such as ethyl acetate, butyl acetate, and isopropyl acetate; ether based-solvents such as diethyl ether, tetrahydrofuran, and dioxane; and glycol ether-based solvents such as ethylene glycol monomethyl ether, and ethylene glycol dimethyl ether. These organic solvent can be used alone or in combination of two or more.

Examples of the polymerizable monomer, prepolymer, oligomers, and polymer include acryl-based polymer, polyvinyl butyral resin, polyurethane resin, polyamide resin, polyester resin, epoxy resin, phenol resin, polycarbonate resin, polyvinyl butyral resin, polyvinyl formal resin, shellac, vinyl-based resin, acryl-based resin, rubber-based resin, waxes, and other natural resins. These can be used alone or in combination of two or more. When the polymer is added to the conductive silica sol composition, film forming properties can be easily adjusted.

In addition, particles such as silica particles, and alumina particles, dyes, pigments, fillers, silane coupling agents, adhesion modifiers, stabilizers, leveling agents, deforming agents, suspending agents, lubricants, or corrosion inhibitors, can also be added to the conductive silica sol composition.

In the conductive silica sol composition according to the present invention, the total content of the silica sol composition and the conductive agent relative to 100 parts by mass of the conductive silica sol composition is preferably in a range from 1.0 to 100 parts by mass, and more preferably in a range from 10.0 to 100 parts by mass. When the total content of the silica sol composition and the conductive agent is 1.0 part by mass or more, sufficient conductivity can be obtained. That is, when the total content of the silica sol composition and the conductive agent is in the range, a conductive silica sol composition having excellent conductivity can be easily obtained.

The conductive silica sol composition according to the present invention can be used under any condition as a coating. For example, the conductive silica sol composition according to the present invention can be used as a no-solvent coating, an organic solvent-containing coating, aqueous-based emulsion coating, etc. When the conductive silica sol composition according to the present invention is used as the organic solvent-containing coating, the above-mentioned organic solvents can be contained. When the conductive silica sol composition according to the present invention is used as a coating, the content of the solvent is adjusted such that the mass ratio between the silica sol composition and the conductive agent in the conductive silica sol composition is in the abovementioned range.

Next, the method for producing the conductive silica sol composition according to the present invention is explained below.

For example, first, the silica film-forming component is hydrolyzed in the organic solvent containing water in the presence of the acidic catalyst, and thereby the silica sol composition is produced. Then, at least one compound selected from the group consisting of the compound represented by the formula (1) and the compound represented by the formula (2), as the conductive agent, in the silica sol composition obtained. Then, if necessary, another component, such as water, an organic solvent, polymerizable monomer, prepolymer, oligomer, and polymer, is added and dispersed. Due to this, the conductive silica sol composition, in which the conductive agent is dispersed uniformly, can be produced.

In the production method, it is preferable that the conductive silica sol composition be produced such that the total content of the silica sol composition and the conductive agent relative to 100 parts by mass of the conductive silica sol composition be in a range from 1.0 to 100 parts by mass, and that the content of the conductive agent relative to 100 parts by mass of the silica film-forming agent in the conductive silica sol composition is in a range of 0.01 to 50.0 parts by mass. When the content of the components is in the above-mentioned ranges, a conductive silica sol composition having excellent conductivity can be easily produced.

The conductive silica sol composition according to the present invention can be used as an antistatic agent for various displays, an adhesive, a conductive painting, conductive coating, etc. The conductive silica sol composition according to the present invention can provide antistatic effects or conductivity for a long period of time.

Next, the molded product produced by using the conductive silica sol composition according to the present invention is explained below. The molded product according to the present invention includes a coating film obtained using the conductive silica sol composition.

As a base for the molded product, a glass base, or a film or a sheet made of well-known resins can be used. After coating the coating containing the conductive silica sol composition on the surface of the base, the coating is dried and treated with heat. Thereby, a silica-based coating film is formed on the base. Moreover, the conductive silica sol composition can be dried and treated with heat at low temperatures, such as 200° C. or less. Therefore, the conductive silica sol composition can be used in an organic base having low heat resistance.

Examples of the coating method include well-known coating methods, such as a dip coating method, spin coating method, spray coating method, bar-coating method, knife coating method, roll coating method, blade coating method, die coating method, and gravure coating method.

In general, the thickness of the silica-based coating film produced is 10 μm or less, preferably 5 μm or less, and more preferably 1 μm or less. When the thickness of the silica-based coating film is 10 μm or less, cracks are not readily generated.

In the molded product according to the present invention, since a silica-based coating film having excellent conductivity is formed, the molded product can be used as a dustproof sheet, a conductive sheet such as a neutralization mat, and an antistatic floor material, an antistatic film, and an antistatic peelable film, etc. The molded products can provide stable properties for a long period of time. In addition, the molded product has excellent heat resistance, and bleeding resistance under high temperature. Therefore, the molded product can be preferably used as a coating film for vehicle installation parts.

EXAMPLES

The effects obtained by the present invention will be explained in detail referring to Examples. Moreover, the present invention is not limited to the following Examples. In addition, "part" in Examples means "parts by mass".

Evaluation Test 1

Example 1

A silica sol composition (silica film-forming component: 10%, marketed by Mitsubishi Material Corporation, trade name: SB-10A) was dissolved in ethanol to obtain a 3%-diluent. Potassium bis(fluorosulfonyl)imide, which is a bis(fluorosulfonyl) imide salt, (abbreviated as "K-FSI") as the conductive agent was added and mixed in the diluent obtained such that the content of K-FSI relative to 100 parts of the silica film-forming component was 10 parts. Thereby, the conductive silica sol composition in Example 1 was produced.

Then, the conductive silica sol composition was coated on a glass base with a spin coater, and this was dried at 120° C. (thermal treatment) to obtain a coating film.

The surface resistivity (abbreviated as "surface resistance") of the coating film obtained was measured using a surface resistance measuring device (Mitsubishi Chemical Corporation, trade name:HT-450) with an applied voltage of 10V. The result was $3 \times 10^9$ Ω/sq. as shown in Table 1.

Example 2

The conductive silica sol composition and the coating film were obtained in a manner identical to that of Example 1, except that lithium bis(fluorosulfonyl)imide (abbreviated as "Li-FSI" below), which is a bis(fluorosulfonyl) imide salt, was used as the conductive agent. The surface resistance of the coating film obtained was measured. The result was $3 \times 10^9$ Ω/sq. as s shown in Table 1.

Example 3

The conductive silica sol composition and the coating film were obtained in a manner identical to that of Example 1, except that lithium bis(trifluoromethane sulfonyl)imide (abbreviated as "Li-TFSI" below), which is a bis(trifluoromethane sulfonyl) imide salt, was used as the conductive agent. The surface resistance of the coating film obtained was measured. The result was 1×10⁹ Ω/sq. as shown in Table 1.

Example 4

The conductive silica sol composition and the coating film were obtained in a manner identical to that of Example 1, except that potassium trifluoromethane sulfonate was used as the conductive agent. The surface resistance of the coating film obtained was 4×10⁹ Ω/sq. as shown in Table 1.

Comparative Example 1

The conductive silica sol composition and the coating film were obtained in a manner identical to that of Example 1, except that only the silica sol composition was used without the conductive agent. The surface resistance of the coating film obtained was 1×10¹⁴ Ω/sq. or more as shown in Table 1.

TABLE 1

| | Conductive Agent | Concentration of Conductive Agent in Silica Film (%) | Surface Resistance (Ω/sq.) |
|---|---|---|---|
| Example 1 | K-FSI | 10.0 | $3 \times 10^9$ |
| Example 2 | Li-FSI | 10.0 | $3 \times 10^9$ |
| Example 3 | Li-TFSI | 10.0 | $1 \times 10^9$ |
| Example 4 | Potassium trifluromethane sulfonate | 10.0 | $4 \times 10^9$ |
| Comparative Example 1 | No (only Silica film) | 0 | $1 \times 10^{14}$ or more |

As shown in Table 1, it was confirmed that the surface resistance of the coating film in Comparative Example 1, in which only silica sol gel solution was coated on the glass base, was 1×10¹⁴ Ω/sq. or more. In contrast, the surface resistance of the coating film in Examples 1 to 4 was higher than that of Comparative Example 1.

Evaluation Test 2

Examples 5 to 7

Similar to Examples 1 to 3, K-FSI, Li-FSI, or Li-TFSI was added and mixed as the conductive agent in the silica film-forming component, such that the content of the conductive agent relative to 100 parts of the silica film-forming component in the conductive silica sol composition was 4.0 parts. Thereby the conductive silica sol composition in Examples 5 to 7 was obtained. Then, the coating film was produced and the surface resistance of the coating film produced was measured. The results are shown in Table 2.

In addition, the coating film obtained in Examples 5 to 7 was heated at 100° C. for 10 minutes, and the surface of the coating film was rubbed using a cotton cloth with a load of 3 kg or more 20 times. Then, the surface resistance was measured again. The results are also shown in Table 2. Moreover, the surface resistance did not change, as shown in Table 2.

TABLE 2

| | Conductive Agent | Concentration of Conductive Agent in Silica Film (%) | Surface Resistance (Ω/sq.) | Surface Resistane after heating and rubbing (Ω/sq.) |
|---|---|---|---|---|
| Example 5 | K-FSI | 4.0 | $1 \times 10^{11}$ | $1 \times 10^{11}$ |
| Example 6 | Li-FSI | 4.0 | $2 \times 10^{11}$ | $2 \times 10^{11}$ |
| Example 7 | Li-TFSI | 4.0 | $3 \times 10^{11}$ | $3 \times 10^{11}$ |

In Examples 5 to 7, the surface resistance did not change after heating the coating film at 100° C. for 10 minutes, and the surface of the coating film was rubbed using a cotton cloth with a load of 3 kg or more 20 times. Due to this, it was confirmed that the coating film obtained in Examples 5 to 7 was excellent in bleeding resistance.

Industrial Applicability

The conductive silica sol composition according to the present invention contains a compound having excellent solubility in the silica sol composition having a siloxane structure. The cation in the compound is dispersed uniformly in the conductive silica sol composition. Therefore, the conductive silica sol composition according to the present invention has excellent conductivity.

The molded product according to the present invention includes a silica-based coating film having excellent conductivity.

In addition, the molded product using the conductive silica sol composition according to the present invention contains a silica-based coating film having excellent conductivity.

The invention claimed is:

1. A conductive silica sol composition containing:
   a silica sol composition containing a silica film-forming component; and
   at least one compound selected from the group consisting of the compounds represented by the following formulae (1) and (2)

$$Rf^1SO_3.X \qquad (1)$$

$$(Rf^2SO_2)(Rf^3SO_2)N.X \qquad (2)$$

in the formulae (1) and (2),
   $Rf^1$, $Rf^2$, and $Rf^3$ represent fluorine, and
   X represents a cation selected from the group consisting of an alkali metal, alkali earth metal, ammonium, phosphonium, alkyl ammonium, and alkyl phosphonium.

2. A conductive silica sol composition according to claim 1, wherein X in the formulae (1) and (2) represents a cation selected from the group consisting of Li⁺, Na⁺, and K⁺.

3. A conductive silica sol composition according to claim 1, wherein the silica film-forming component contains silica sol which is obtained by hydrolysis of tetraalkoxysilane.

4. A conductive silica sol composition according to claim 1, wherein the conductive silica sol composition contains 0.01 to 50.0 parts by mass of the compound represented by the formula (1) or (2), relative to 100 parts by mass of the silica film-forming component.

5. A molded product containing a coating film obtained by using the conductive silica sol composition according to claim 1.

6. A conductive silica sol composition according to claim 2, wherein the silica film-forming component contains silica sol which is obtained by hydrolysis of tetraalkoxysilane.

7. A conductive silica sol composition according to claims 2, wherein the conductive silica sol composition contains 0.01 to 50.0 parts by mass of the compound represented by the formula (1) or (2), relative to 100 parts by mass of the silica film-forming component.

8. A conductive silica sol composition according to claims 3, wherein the conductive silica sol composition contains 0.01 to 50.0 parts by mass of the compound represented by the formula (1) or (2), relative to 100 parts by mass of the silica film-forming component.

9. A conductive silica sol composition according to claims 6, wherein the conductive silica sol composition contains 0.01 to 50.0 parts by mass of the compound represented by the formula (1) or (2), relative to 100 parts by mass of the silica film-forming component.

10. A molded product containing a coating film obtained by using the conductive silica sol composition according to claim 2.

11. A molded product containing a coating film obtained by using the conductive silica sol composition according to claim 3.

12. A molded product containing a coating film obtained by using the conductive silica sol composition according to claim 4.

13. A molded product containing a coating film obtained by using the conductive silica sol composition according to claim 6.

14. A molded product containing a coating film obtained by using the conductive silica sol composition according to claim 7.

15. A molded product containing a coating film obtained by using the conductive silica sol composition according to claim 8.

16. A molded product containing a coating film obtained by using the conductive silica sol composition according to claim 9.

* * * * *